US006999975B1

(12) United States Patent (10) Patent No.: US 6,999,975 B1
Garrean (45) Date of Patent: Feb. 14, 2006

(54) SYSTEM AND METHOD FOR IDENTIFYING RECORDS WITH VALID ADDRESS, BUT INVALID NAME INFORMATION

(75) Inventor: Michael E. Garrean, Omaha, NE (US)

(73) Assignee: Cas, Inc., Omaha, NE (US)

( * ) Notice: Subject to any disclaimer, the term of this patent is extended or adjusted under 35 U.S.C. 154(b) by 582 days.

(21) Appl. No.: 10/054,563

(22) Filed: Jan. 22, 2002

Related U.S. Application Data

(60) Provisional application No. 60/332,823, filed on Nov. 14, 2001.

(51) Int. Cl.
*G06F 17/00* (2006.01)
(52) U.S. Cl. ...................................... 707/200; 382/101
(58) Field of Classification Search ................ 395/600; 707/5, 4, 7, 6, 104.1, 9, 10, 104, 200, 201; 382/101
See application file for complete search history.

(56) References Cited

U.S. PATENT DOCUMENTS 5,799,302 A * 8/1998 Johnson et al. ................. 707/7
6,041,324 A * 3/2000 Earl et al. ....................... 707/9
6,418,436 B1 * 7/2002 Degen et al. ................... 707/6

* cited by examiner

*Primary Examiner*—Charles Rones
*Assistant Examiner*—Jacob F. Betit
(74) *Attorney, Agent, or Firm*—Suiter West Swantz pc llo

(57) ABSTRACT

A method and system for identifying records with a valid address, but invalid name information automatically determines if an address is in a set (file) of known valid addresses, and that the name is not in the subset of names associated with the address by calculating the acceptable probability of a match between the addresses and names. In order to calculate the acceptable probability of a match heuristics may be determined for various operating systems, applications, application environments, etc. Integration of the method and system of present invention may be determined by a particular condition, configuration, and/or environment at any given period of time and may, for example, be incorporated in environments such as a computer controlled printer (Inkjet, Laser, etc.) environment or database ETL (Extract, Transform and Load) environment.

26 Claims, 2 Drawing Sheets

SYSTEM AND METHOD FOR IDENTIFYING RECORDS WITH VALID ADDRESS, BUT INVALID NAME INFORMATION

CROSS-REFERENCE TO RELATED APPLICATIONS

The present application claims the benefit under 35 U.S.C. § 119(e) of U.S. Provisional Application No. 60/332,823, filed Nov. 14, 2001. Said U.S. Provisional Application No. 60/332,823 is herein incorporated by reference in its entirety.

FIELD OF THE INVENTION

The present invention is generally related to mail processing systems commonly utilized for providing direct mail services and the like, and more particularly to a system and method for identifying mail records with valid addresses, but invalid name information.

BACKGROUND OF THE INVENTION

Direct mail campaigns can be extremely effective for disseminating information to a large audience. The originators of such campaigns commonly employ computer-based information handling systems to maintain databases containing mailing information for individuals within an audience targeted to receive information. However these systems currently have no way of determining whether the party being addressed exists at the location or address obtained for that individual. If the targeted party does not reside at the given location, information sent to that location likely will not reach the party, wasting the resources of the originator of the campaign. Consequently, with direct mail expenses constantly increasing due to increased costs for postage, labor, materials and the like, and with mail security becoming a prevalent issue, it is desirable to verify the accuracy of mailing information obtained for the audience targeted to receive the direct mail campaign.

Known to the art are software applications which compare a database containing mailing addresses with a database containing known addresses to determine if an address is contained within a set of known addresses. These applications prevent processing of records not in the known set saving the material, labor and transportation costs. However, such applications cannot determine if the party (name) targeted to receive information is at the verified address.

Accordingly, it would be advantageous to provide a method for determining whether a party (name) is contained within the subset of names associated with an address contained within the set of known addresses. In this manner, it would be possible to prevent mailing of information to locations where an targeted party does not reside, saving further material, labor and transportation costs.

SUMMARY OF THE INVENTION

The present invention is directed to a novel method for automatically determining if a record address belongs to a set of known addresses and the associated record name does not belong to the subset of known names associated with the known address. In exemplary embodiments, the probability of match between the addresses is calculated and the probability of mismatch of names associated with the address is then computed. Heuristics are employed for computing the probability of match and mismatch.

The present invention may be utilized in mail processing systems as a complimentary technology in computer controlled printers such as an laser printer addressing letters to be mailed, where it is desirable to know if the intended recipient is at the address on the record to be printed. Similarly, the present invention may be utilized in conjunction with an ETL (Extract, Transform, and Load) database environment where it is desirable to know that the name and address information stored in the database is correct.

It is understood that both the foregoing general description and the following detailed description are exemplary and explanatory only and are not restrictive of the invention claimed. The accompanying drawings, which are incorporated in and constitute part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
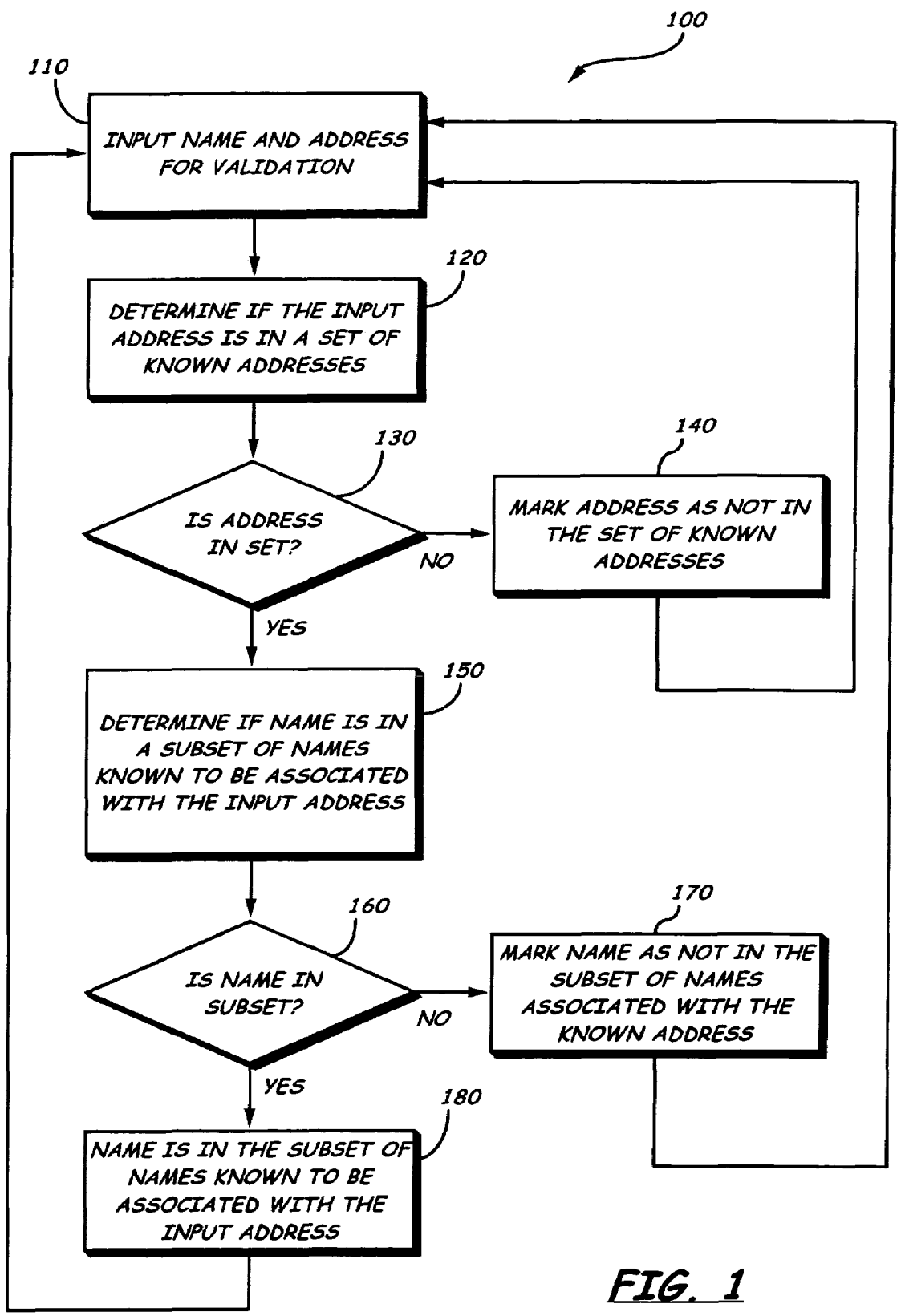
FIG. 1 is a flow diagram illustrating a method for automatically determining if a record address belongs to a set of known addresses and the associated record name does not belong to the subset of known names associated with the known address in accordance with an exemplary embodiment of the present invention.

Referring now to FIG. 1, an exemplary method for automatically identifying records with a valid address, but invalid name information in a information handling system is described. The method 100 may, for example, be implemented in a mail processing system or like information handling system (see FIGS. 2 and 3) when an event or condition within an application executed by the system requires input of a record with name and address for processing. When such a record is input at step 110, the address from the input record is compared against a set of records to determine if the address matches an address in the known set at step 130. Preferably, to determine if a match is made, heuristics may be determined for various operating systems, applications, application environments, and the like. These heuristics preferably lead to the correct determination of the address being a match to any record in the known set of addresses, by implementing a non-rigorous or self-learning approach. For example, in a preferred embodiment, the determination of a match may be based on the premise that a match is made if weights are assigned to specific address components (house number, street name and the like), and the sum of the weights for address components that match exceed a threshold value. For example the weighted address value (WAV) may be calculated as follows:

$$WAV=(W1 \cdot V1)+(W2 \cdot V2)+ \ldots (Wn \cdot Vn)$$

where W(1, . . . n) is the weight assigned to the various address components and V(1, . . . n) is 1 if the components match, 0 if the component is missing and −1 if the components do not match. If the weighted address value (WAV) is greater than the threshold address value (TAV) then a match is made. TAV may be determined by experimentation or may be set as a parameter by an operator using the invention. If the address is not in the set of known addresses it is marked as unknown address at step 160 and returned to the application step 110. If the address belongs to the set of known addresses, the name is then compared to the subset of names known to be associated with the known address at step 140. Preferably, to determine if a match is made, heuristics may be determined for various operating systems, applications, application environments, and the like. These heuristics preferably lead to the correct determination of the name being a match to any record in the known subset of names, by implementing a non-rigorous or self-learning approach. For example, in a preferred embodiment, the determination of a match may be based on the premise that a match is made if weights are assigned to specific name components (title, first name and the like), and the sum of the weights for name components that match exceed a threshold value. For example the weighted name value (WNV) may be calculated as follows:

$$WAV=(W1 \cdot V1)+(W2 \cdot V2)+ \ldots (Wn \cdot Vn)$$

where W(1, . . . n) is the weight assigned to the various name components and V(1, . . . n) is 1 if the components match and 0 if the components do not match. In comparison of components the first letter and single consonants may be used, dropping vowels. If WNV is greater than the threshold name value (TNV) then a match is made. TNV may be determined by experimentation or may be set as a parameter by an operator using the invention. If the name does not belong to the subset of names associated with the known address the record is marked as an unknown name at a known (valid) address (phantom) at step 170 and returned to the application step 110. If the name belongs to the subset of known names associated with the known address the record is marked as a known name and address at step 150 and returned to the application step 110.

An example illustrating the application of the method shown in FIG. 1 for identifying records with valid addresses, but invalid name information is now provided for illustration. The known set of addresses and names is as follows:

| ADDRESS | SUBSET OF ASSOCIATED NAMES |
|---|---|
| 123 N. Main St Apt 1 Smalltown, NE 68106 | John Smith Nancy Jones |
| 41 Corby Ave Metro, NY 10112 | Harry Guy Nada Guy |
| 702 State Rd 4 Pipeline, AK 99702 | Otto Doors Rusty Doors |

The address components that will be matched and their weights are:

| ADDRESS COMPONENT | WEIGHT |
|---|---|
| House number | 2 |
| Pre-directional | 1 |
| Street name | 4 |
| Suffix | 1 |
| Post-directional | 1 |
| Secondary type | 2 |
| Secondary number | 2 |
| City name | 4 |
| State | 4 |
| Zip code | 1 |

The name components and their weights are:

| NAME COMPONENT | WEIGHT |
|---|---|
| First name | 2 |
| First initial | 1 |
| Last name | 3 |

By way of example only, if the threshold address value (TAV) and the threshold name value (TNV) are determined to be 13 and 4 respectfully, based on experimentation or data entered by an operator of a system employing the present method, then when the following name and address is presented the method would automatically notify the application system that the address is not in the set of known addresses:

Mary Lamb 402 Corby Ave, Metro, N.Y. 10111

When matched against known address the matches would be as follows:

| KNOWN ADDRESS 1 | | | | |
|---|---|---|---|---|
| Address Component | Weight | Input Record | Known Record 1 | Match Value | Weight Value |
| House number | 2 | 402 | 123 | −1 (No Match) | −2 |
| Pre-directional | 1 | | N | 0 (Missing) | 0 |
| Street name | 4 | Corby | Main | −1 (No Match) | −4 |
| Suffix | 1 | Ave | St | −1 (No Match) | −1 |
| Post-directional | 1 | | | 0 (Missing) | 0 |
| Secondary type | 2 | | Apt | 0 (Missing) | 0 |
| Secondary number | 2 | | 1 | 0 (Missing) | 0 |
| City name | 4 | Metro | Smalltown | −1 (No Match) | −4 |
| State | 4 | NY | NE | −1 (No Match) | −4 |
| Zip code | 1 | 10111 | 68106 | −1 (No Match) | −1 |
| | | | | WAV = | −16 |

| KNOWN ADDRESS 2 | | | | |
|---|---|---|---|---|
| Address Component | Weight | Input Record | Known Record 2 | Match Value | Weight Value |
| House number | 2 | 402 | 41 | −1 (No Match) | −2 |
| Pre-directional | 1 | | | 0 (Missing) | 0 |
| Street name | 4 | Corby | Corby | 1 (Match) | 4 |
| Suffix | 1 | Ave | Ave | 1 (Match) | 1 |
| Post-directional | 1 | | | 0 (Missing) | 0 |
| Secondary type | 2 | | | 0 (Missing) | 0 |
| Secondary number | 2 | | | 0 (Missing) | 0 |

-continued

| Address Component | Weight | Input Record | Known Record | Match Value | Weight Value |
|---|---|---|---|---|---|
| City name | 4 | Metro | Metro | 1 (Match) | 4 |
| State | 4 | NY | NY | 1 (Match) | 4 |
| Zip code | 1 | 10111 | 10112 | −1 (No Match) | −1 |
| | | | | WAV = | 10 |

KNOWN ADDRESS 3

| Address Component | Weight | Input Record | Known Record 3 | Match Value | Weight Value |
|---|---|---|---|---|---|
| House number | 2 | 402 | 702 | −1 (No Match) | −2 |
| Pre-directional | 1 | | | 0 (Missing) | 0 |
| Street name | 4 | Corby | State Rd 4 | −1 (No Match) | −4 |
| Suffix | 1 | Ave | | 0 (Missing) | 0 |
| Post-directional | 1 | | | 0 (Missing) | 0 |
| Secondary type | 2 | | | 0 (Missing) | 0 |
| Secondary number | 2 | | | 0 (Missing) | 0 |
| City name | 4 | Metro | Pipeline | −1 (No Match) | −4 |
| State | 4 | NY | AK | −1 (No Match) | −4 |
| Zip code | 1 | 10111 | 99702 | −1 (No Match) | −1 |
| | | | | WAV = | −15 |

The input record does not have a WAV value equal to or greater than the threshold address value (TAV) of 13, thus the address does not match a known address.

If the following name and address is presented the method would automatically notify the application system that the address is in the set of known addresses, but the name is not in the subset of associated names:

Mary Lamb 41 Corby Ave, Metro, N.Y. 10111

When matched against known address the matches would be as follows:

KNOWN ADDRESS 1

| Address Component | Weight | Input Record | Known Record 1 | Match Value | Weight Value |
|---|---|---|---|---|---|
| House number | 2 | 41 | 123 | −1 (No Match) | −2 |
| Pre-directional | 1 | | N | 0 (Missing) | 0 |
| Street name | 4 | Corby | Main | −1 (No Match) | −4 |
| Suffix | 1 | Ave | St | −1 (No Match) | −1 |
| Post-directional | 1 | | | 0 (Missing) | 0 |
| Secondary type | 2 | | Apt | 0 (Missing) | 0 |
| Secondary number | 2 | | 1 | 0 (Missing) | 0 |
| City name | 4 | Metro | Smalltown | −1 (No Match) | −4 |
| State | 4 | NY | NE | −1 (No Match) | −4 |
| Zip code | 1 | 10111 | 68106 | −1 (No Match) | −1 |
| | | | | WAV = | −16 |

KNOWN ADDRESS 2

| Address Component | Weight | Input Record | Known Record 2 | Match Value | Weight Value |
|---|---|---|---|---|---|
| House number | 2 | 41 | 41 | 1 (Match) | 2 |
| Pre-directional | 1 | | | 0 (Missing) | 0 |
| Street name | 4 | Corby | Corby | 1 (Match) | 4 |
| Suffix | 1 | Ave | Ave | 1 (Match) | 1 |
| Post-directional | 1 | | | 0 (Missing) | 0 |
| Secondary type | 2 | | | 0 (Missing) | 0 |
| Secondary number | 2 | | | 0 (Missing) | 0 |
| City name | 4 | Metro | Metro | 1 (Match) | 4 |
| State | 4 | NY | NY | 1 (Match) | 4 |
| Zip code | 1 | 10111 | 10112 | −1 (No Match) | −1 |
| | | | | WAV = | 13 |

KNOWN ADDRESS 2 ASSOCIATED NAME 1

| Name Component | Weight | Input Record | Associated Name 1 | Match Value | Weight Value |
|---|---|---|---|---|---|
| First name | 2 | Mary | Harry | −1 (No Match) | −2 |
| First initial | 1 | M | H | −1 (No Match) | −1 |
| Last name | 3 | Lamb | Guy | −1 (No Match) | −3 |
| | | | | WNV = | −6 |

KNOWN ADDRESS 2 ASSOCIATED NAME 2

| Name Component | Weight | Input Record | Associated Name 2 | Match Value | Weight Value |
|---|---|---|---|---|---|
| First name | 2 | Mary | Nada | −1 (No Match) | −2 |
| First initial | 1 | M | N | −1 (No Match) | −1 |
| Last name | 3 | Lamb | Guy | −1 (No Match) | −3 |
| | | | | WNV = | −6 |

KNOWN ADDRESS 3

| Address Component | Weight | Input Record | Known Record 3 | Match Value | Weight Value |
|---|---|---|---|---|---|
| House number | 2 | 41 | 702 | −1 (No Match) | −2 |
| Pre-directional | 1 | | | 0 (Missing) | 0 |
| Street name | 4 | Corby | State Rd 4 | −1 (No Match) | −4 |
| Suffix | 1 | Ave | | 0 (Missing) | 0 |
| Post-directional | 1 | | | 0 (Missing) | 0 |
| Secondary type | 2 | | | 0 (Missing) | 0 |
| Secondary number | 2 | | | 0 (Missing) | 0 |
| City name | 4 | Metro | Pipeline | −1 (No Match) | −4 |
| State | 4 | NY | AK | −1 (No Match) | −4 |
| Zip code | 1 | 10111 | 99702 | −1 (No Match) | −1 |
| | | | | WAV = | −15 |

Here the input address has a WAV equal or greater than the TAV for known address 2, however the WNV is less than the TNV for both names associated with known address 2.

If the following name and address is presented the method would automatically notify the application system that the address is in the set of known addresses, and the name is in the subset of associated names:

N Guy 41 Corby Ave, Metro, N.Y. 10111

When matched against known address the matches would be as follows:

KNOWN ADDRESS 1

| Address Component | Weight | Input Record | Known Record 1 | Match Value | Weight Value |
|---|---|---|---|---|---|
| House number | 2 | 41 | 123 | −1 (No Match) | −2 |
| Pre-directional | 1 | | N | 0 (Missing) | 0 |
| Street name | 4 | Corby | Main | −1 (No Match) | −4 |
| Suffix | 1 | Ave | St | −1 (No Match) | −1 |
| Post-directional | 1 | | | 0 (Missing) | 0 |
| Secondary type | 2 | | Apt | 0 (Missing) | 0 |
| Secondary number | 2 | | 1 | 0 (Missing) | 0 |
| City name | 4 | Metro | Smalltown | −1 (No Match) | −4 |

-continued

| | | | | |
|---|---|---|---|---|
| State | 4 | Ny | Ne | −1 (No Match) | −4 |
| Zip code | 1 | 10111 | 68106 | −1 (No Match) | −1 |
| | | | | WAV = | −16 |

KNOWN ADDRESS 2

| Address Component | Input Weight | Known Record | Record 2 | Match Value | Weight Value |
|---|---|---|---|---|---|
| House number | 2 | 41 | 41 | 1 (Match) | 2 |
| Pre-directional | 1 | | | 0 (Missing) | 0 |
| Street name | 4 | Corby | Corby | 1 (Match) | 4 |
| Suffix | 1 | Ave | Ave | 1 (Match) | 1 |
| Post-directional | 1 | | | 0 (Missing) | 0 |
| Secondary type | 2 | | | 0 (Missing) | 0 |
| Secondary number | 2 | | | 0 (Missing) | 0 |
| City name | 4 | Metro | Metro | 1 (Match) | 4 |
| State | 4 | NY | NY | 1 (Match) | 4 |
| Zip code | 1 | 10111 | 10112 | −1 (No Match) | −1 |
| | | | | WAV = | 13 |

KNOWN ADDRESS 2 ASSOCIATED NAME 1

| Name Component | Input Weight | Record | Associated Name 1 | Match Value | Weight Value |
|---|---|---|---|---|---|
| First name | 2 | | Harry | 0 (Missing) | 0 |
| First initial | 1 | N | H | −1 (No Match) | −1 |
| Last name | 3 | Guy | Guy | 1 (Match) | 3 |
| | | | | WNV = | 2 |

KNOWN ADDRESS 2 ASSOCIATED NAME 2

| Name Component | Input Weight | Record | Associated Name 2 | Match Value | Weight Value |
|---|---|---|---|---|---|
| First name | 2 | | Nada | 0 (Missing) | 0 |
| First initial | 1 | N | N | 1 (Match) | 1 |
| Last name | 3 | Guy | Guy | 1 (Match) | 3 |
| | | | | WNV = | 4 |

KNOWN ADDRESS 3

| Address Component | Input Weight | Known Record | Record 3 | Match Value | Weight Value |
|---|---|---|---|---|---|
| House number | 2 | 41 | 702 | −1 (No Match) | −2 |
| Pre-directional | 1 | | | 0 (Missing) | 0 |
| Street name | 4 | Corby | State Rd 4 | −1 (No Match) | −4 |
| Suffix | 1 | Ave | | 0 (Missing) | 0 |
| Post-directional | 1 | | | 0 (Missing) | 0 |
| Secondary type | 2 | | | 0 (Missing) | 0 |
| Secondary number | 2 | | | 0 (Missing) | 0 |
| City name | 4 | Metro | Pipeline | −1 (No Match) | −4 |
| State | 4 | NY | AK | −1 (No Match) | −4 |
| Zip code | 1 | 10111 | 99702 | −1 (No Match) | −1 |
| | | | | WAV = | −15 |

Here the input address has a WAV equal or greater than the TAV for known address 2 and the WNV is equal or greater than the TNV for the second name associated with known address 2.

Figure 2:
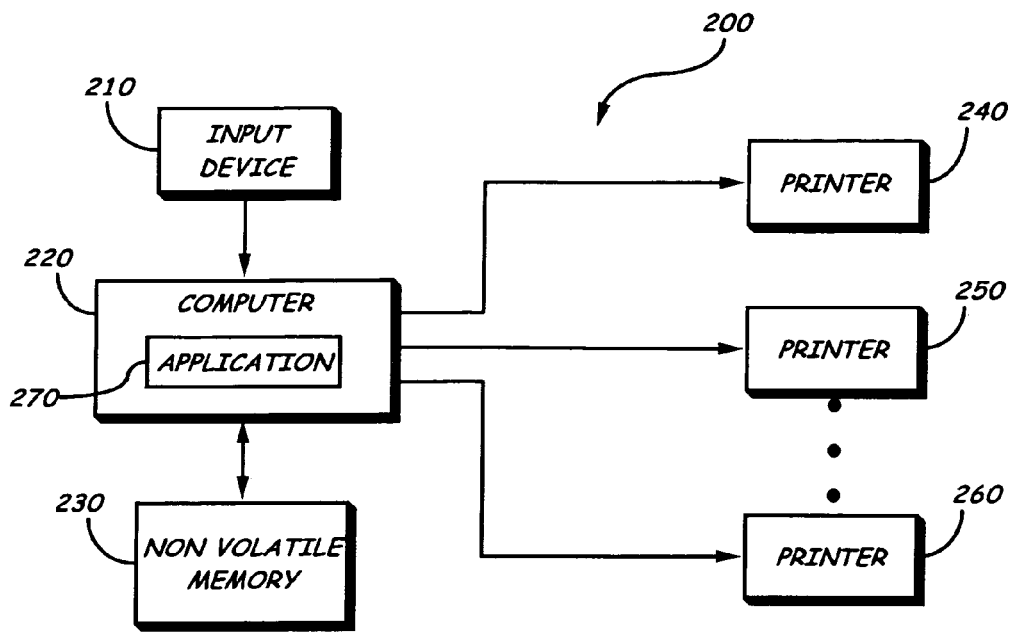
FIG. 2 is a block diagram depicting a computer controlled printer (Inkjet, Laser, etc) environment capable of implementing the method shown in FIG. 1 in accordance with an exemplary embodiment of the present invention.

Referring now to FIG. 2, a block diagram depicting an exemplary computer controlled printer (Inkjet, Laser, or the like) mail processing system in accordance with the present invention is shown. The mail processing system 200 may include a computer (minicomputer, mainframe computer, personal computer, or the like) 220 interconnected with an input device (tape drive) 210, a non-volatile storage device (disk drive) 230 and one or more printing devices 240, 250 and 260. The mail processing system 200 may have a client/server architecture which makes use of distributed intelligence to treat the computer (or server) 220 and all devices (or clients) 210,230, 240, 250 and 260 as intelligent programmable devices, thus exploiting the full information processing capacity of each device. This may be accomplished by dividing the processing of data between the server 220 and the attached devices 210, 230, 240, 250 and 260. For example the server 220 may run administrative software that controls requests for data from and to all devices 210, 230, 240, 250 and 260 to the mail processing system 200, while each device 210, 230, 240, 250 and 260 may run software that is optimized to the device function.

As shown in FIG. 2, the mail processing system 200 may operate in a mainframe computer environment where the mail processing system 200 would determine if an input record is to be printed, how the input record is to be printed (e.g., on a letter, an envelope, a mailer, or the like) and where the input record is to be printed (e.g., on which printing device 240, 250 or 260). In this manner the mail processing system 200 minimizes the material, labor and transportation costs.

In exemplary embodiments, computer (server) 220 or alternately a client device 210, 230, 240, 250 or 260 may execute an application 270 implementing method 100 shown in FIG. 1. In this manner, system 200 may identify records with valid address information, but invalid name information. As described in the discussion of FIG. 1, this may be accomplished by determining if the address of the record to be printed is in a set of known addresses and, if the address of the record is determined to be in the set of known addresses, determining if the name of the record to be printed is in a subset of known names associated with the address by calculating a weighted name value for the name and comparing the weighted name value with a predetermined threshold name value. If the address is determined to be in the set of known addresses and the name is determined to not be in the subset of known names associated with the address, the record may be marked as having valid address information, but invalid name information to prevent printing of the record.

Figure 3:
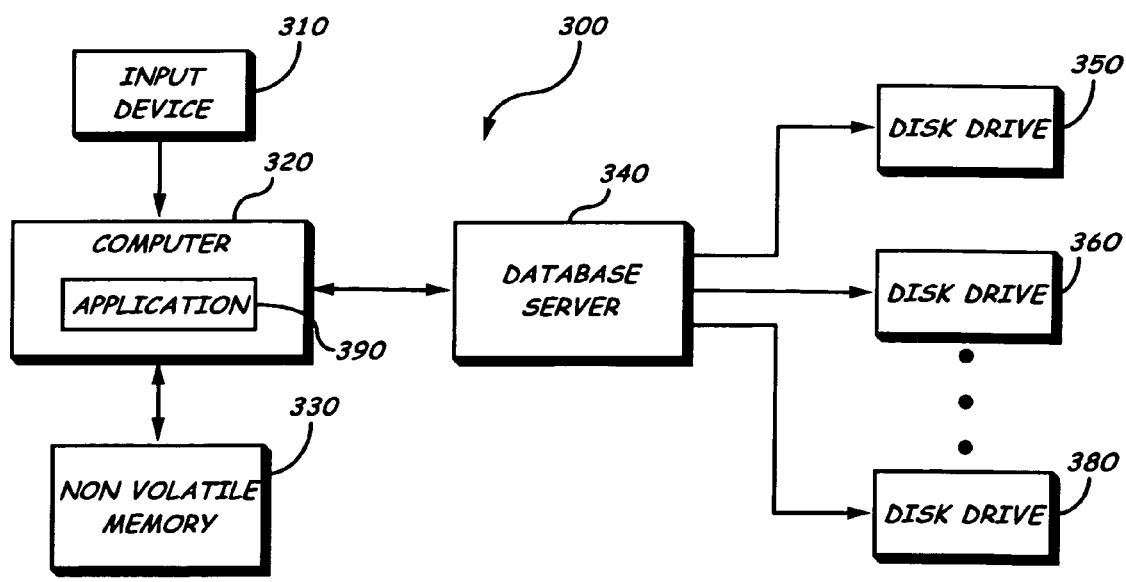
FIG. 3 is a block diagram depicting an information handling system implementing a computer controlled database ETL (Extract, Transform and Load) environment.

Turning now to FIG. 3, a block diagram depicting an information handling system implementing a computer controlled database ETL (Extract, Transform and Load) environment. The information handling system 300 may include a computer (minicomputer, mainframe computer or personal computer) 320 interconnected with an input device (tape drive) 310, a non-volatile storage device (disk drive) 330, a database server 340, which in turn may be connected to one or more disk drives 350, 360 and 370. The information handling system 300 may have a client/server architecture which makes use of distributed intelligence to treat the computer (server) 320 and all devices (or clients) 310, 330, 340, 350, 360 and 370 as intelligent programmable devices, thus exploiting the full information processing capacity of each device. This may be accomplished by dividing the processing of data between the server 320 and the attached devices 310, 330, 340, 350, 360 and 370. For example, the server 320 may run administrative software that controls requests for data from and to devices 310, 330, and 340 to the information handling system 300, while the database server 340 controls requests for data from and to devices 350, 360 and 370 to the server 320, while each device 310, 330, 340, 350, 360 and 370 may run software that is optimized to the device function.

As shown in FIG. 3, the information handling system 300 may operate in a mainframe computer environment where the information handling system 300 would determine if an input record is to be stored, how it is to be stored and where it is to be stored. In this manner the information handling system 300 minimizes the storage and processing costs.

In exemplary embodiments, computer (server) 320 or alternately, database server 340 or a devices 310, 330, 350, 360 or 380 may execute an application 390 implementing method 100 shown in FIG. 1. In this manner, system 300 may identify records with valid address information, but invalid name information. As described in the discussion of FIG. 1, this may be accomplished by determining if the address of the record to be printed is in a set of known addresses and, if the address of the record is determined to be in the set of known addresses, determining if the name of the record to be printed is in a subset of known names associated with the address by calculating a weighted name value for the name and comparing the weighted name value with a predetermined threshold name value. If the address is determined to be in the set of known addresses and the name is determined to not be in the subset of known names associated with the address, the record may be marked as having valid address information, but invalid name information. The marked record may then be deleted from the database of records being analyzed if so desired.

Although the invention has been described with a certain degree of particularity, it should be recognized that elements thereof, including different heuristics, may be altered by persons skilled in the art without departing from the spirit and scope of the invention. One of the embodiments of the invention can be implemented as sets of instructions resident in the main memory of one or more computer systems such as computers 220 and 320 shown in FIGS. 2 and 3, respectively. Until required by the computer system, the set of instructions may be stored in another computer readable memory such as the computer system's auxiliary memory, for example in a hard disk drive or in a removable memory such as an optical disk for utilization in a CD-ROM drive, a floppy disk for utilization in a floppy disk drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer implemented method for identifying records with valid address information, but invalid name information, comprising:
   obtaining a record containing a name and an address;
   determining if the address is in a set of known addresses by calculating a weighted address value for the address and comparing the weighted address value with a predetermined threshold address value, the weighted address value being calculated using the formula:

$$WAV=(W1 \cdot V1)+(W2 \cdot V2)+ \ldots (Wn \cdot Vn)$$

where WAV is the weighted address value, $W(1, \ldots n)$ is the weight assigned to components of the address and $V(1, \ldots n)$ is a value assigned to components of the address, $V(1, \ldots n)$ being assigned a value of 1 if the component matches a corresponding component of an address in the set of known addresses, 0 if the component is not found in the set of known addresses and $-1$ if the component does not match the corresponding component of the address in the set of known addresses; and
   if the address of the obtained record is determined to be in the set of known addresses, determining if the name of the obtained record is in a subset of known names associated with the address using a heuristic.

2. The method as claimed in claim 1, wherein the heuristic comprises calculating a weighted name value for the name and comparing the weighted name value with a predetermined threshold name value.

3. The method as claimed in claim 2, wherein weighted name value is calculated using the formula:

$$WNV=(W1 \cdot V1)+(W2 \cdot V2)+ \ldots (Wn \cdot Vn)$$

where WNV is the weighted name value, $W(1, \ldots n)$ is the weight assigned to components of the name and $V(1, \ldots n)$ is a value assigned to components of the name.

4. The method as claimed in claim 3, wherein $V(1, \ldots n)$ is assigned a value of 1 if the component matches a corresponding component of a name in the subset of known names and 0 if the component does not match the corresponding component of the name in the subset of known names.

5. The method as clamed in claim 3, wherein the name is determined to not be in the subset of known names associated with the known address if the weighted name value is less than the threshold name value.

6. The method as claimed in claim 5, further comprising, if the address is determined to be in the set of known addresses and the name is determined to not be in the subset of known names associated with the known address, marking the record as having valid address information, but invalid name information.

7. The method as claimed in claim 1, further comprising if the address is determined to be in the set of known addresses and the name is determined to not be in the subset of known names associated with the address, marking the record as having valid address information, but invalid name information.

8. The method as claimed in claim 7, further comprising preventing information from being mailed to the address of the marked record.

9. The method as claimed in claim 7, further comprising removing the marked record from a database of records.

10. The method as claimed in claim 1, wherein the obtained address is determined to be in the set of known addresses if the weighted address value for the address is less than a predetermined threshold address value.

11. The method as claimed in claim 1, further comprising, if the address is determined to be in the set of known addresses and the name is determined to not be in the subset of known names associated with the known address, marking the record as having valid address information, but invalid name information.

12. A computer implemented method for identifying a record with valid address information, but invalid name information, comprising:
  obtaining a record containing a name and an address;
  determining if the address is in a set of known addresses by calculating a weighted address value for the address and comparing the weighted address value with a predetermined threshold address value, the weighted address value being calculated using the formula:

$$WAV=(W1 \cdot V1)+(W2 \cdot V2)+ \ldots (Wn \cdot Vn)$$

where WAV is the weighted address value, $W(1, \ldots n)$ is the weight assigned to components of the address and $V(1, \ldots n)$ is a value assigned to components of the address, $V(1, \ldots n)$ being assigned a value of 1 if the component matches a corresponding component of an address in the set of known addresses, 0 if the component is not found in the set of known addresses and $-1$ if the component does not match the corresponding component of the address in the set of known addresses; and
    if the address of the obtained record is determined to be in the set of known addresses, determining if the name of the obtained record is in a subset of known names associated with the address by calculating a weighted name value for the name and comparing the weighted name value with a predetermined threshold name value.

13. The method as claimed in claim 1, further comprising if the address is determined to be in the set of known addresses and the name is determined to not be in the subset of known names associated with the address, marking the record as having valid address information, but invalid name information.

14. The method as claimed in claim 13, further comprising preventing information from being mailed to the address of the marked record.

15. The method as claimed in claim 13, further comprising removing the marked record from a database of records.

16. The method as claimed in claim 1, wherein weighted name value is calculated using the formula:

$$WNV=(W1 \cdot V1)+(W2 \cdot V2)+ \ldots (Wn \cdot Vn)$$

where WNV is the weighted name value, $W(1, \ldots n)$ is the weight assigned to components of the name and $V(1, \ldots n)$ is a value assigned to components of the name.

17. The method as claimed in claim 16, wherein $V(1, \ldots n)$ is assigned a value of 1 if the component matches a corresponding component of a name in the subset of known names and 0 if the component does not match the corresponding component of the name in the subset of known names.

18. The method as clamed in claim 16, wherein the name is determined to not be in the subset of known names associated with the known address if the weighted name value is less than the threshold name value.

19. The method as claimed in claim 18, further comprising, if the address is determined to be in the set of known addresses and the name is determined to not be in the subset of known names associated with the known address, marking the record as having valid address information, but invalid name information.

20. The method as clamed in claim 12, wherein the obtained address is determined to be in the set of known addresses if the weighted address value for the address is less than a predetermined threshold address value.

21. The method as claimed in claim 20, further comprising, if the address is determined to be in the set of known addresses and the name is determined to not be in the subset of known names associated with the known address, marking the record as having valid address information, but invalid name information.

22. A system for identifying a record with valid address information, but invalid name information, comprising:
  means for obtaining a record containing a name and an address;
  means for determining if the address is in a set of known addresses; and
  means for determining if the name of the obtained record is in a subset of known names associated with the address by calculating a weighted name value for the name and comparing the weighted name value with a predetermined threshold name value;
  wherein the means for determining if the address is in a set of known addresses comprises means for calculating a weighted address value for the address and comparing the weighted address value with a predetermined threshold address value, the weighted address value being calculated using the formula:

$$WAV=(W1 \cdot V1)+(W2 \cdot V2)+ \ldots (Wn \cdot Vn)$$

where WAV is the weighted address value, $W(1, \ldots n)$ is the weight assigned to components of the address and $V(1, \ldots n)$ is a value assigned to components of the address, wherein $V(1, \ldots n)$ has a value of 1 if the component matches a corresponding component of an address in the set of known addresses, 0 if the component is not found in the set of known addresses and $-1$ if the component does not match the corresponding component of the address in the set of known addresses.

23. The system as claimed in claim 22, further comprising means for marking the record as having valid address information, but invalid name information if the address is determined to be in the set of known addresses and the name is determined to not be in the subset of known names associated with the address.

24. The system as claimed in claim 23, further comprising means for preventing information from being mailed to the address of the marked record.

25. The system as claimed in claim 23, further comprising means for removing the marked record from a database of records.

26. The system as claimed in claim 22, wherein weighted name value is calculated using the formula:

$$WNV=(W1 \cdot V1)+(W2 \cdot V2)+ \ldots (Wn \cdot Vn)$$

where WNV is the weighted name value, $W(1, \ldots n)$ is the weight assigned to components of the name and $V(1, \ldots n)$ is a value assigned to components of the name, wherein $V(1, \ldots n)$ is assigned a value of 1 if the component matches a corresponding component of a name in the subset of known names and 0 if the component does not match the corresponding component of the name in the subset of known names.

* * * * *